United States Patent [19]

Wittmann et al.

[11] Patent Number: 4,975,197
[45] Date of Patent: Dec. 4, 1990

[54] ORBAL WASTEWATER TREATMENT PROCESS

[75] Inventors: John W. Wittmann, New Berlin; Donald J. Thiel, Waukesha; George W. Smith, Mukwonago, all of Wis.

[73] Assignee: Envirex Inc., Waukesha, Wis.

[21] Appl. No.: 477,157

[22] Filed: Feb. 8, 1990

Related U.S. Application Data

[63] Continuation of Ser. No. 347,001, May 3, 1989, abandoned.

[51] Int. Cl.$^5$ .................................................. C02F 3/20
[52] U.S. Cl. ..................................... 210/626; 210/628; 210/629; 210/926
[58] Field of Search ................ 210/620, 621, 622, 623, 210/626, 627, 628, 629, 195.1, 195.3, 199, 220, 926

[56] References Cited

U.S. PATENT DOCUMENTS

| | | | |
|---|---|---|---|
| 3,764,523 | 10/1973 | Stankewich, Jr. | 210/5 |
| 3,939,068 | 2/1976 | Wendt et al. | 210/7 |
| 3,953,327 | 4/1976 | Parker | 210/7 |
| 3,964,998 | 6/1976 | Barnard | 210/7 |
| 3,994,802 | 11/1976 | Casey et al. | 210/5 |
| 4,056,465 | 11/1977 | Spector | 210/7 |
| 4,159,243 | 6/1979 | Okey | 210/629 |
| 4,206,047 | 6/1980 | Mandt | 210/627 X |
| 4,269,709 | 5/1981 | Rongved | 210/926 X |
| 4,443,338 | 4/1984 | Reid | 210/629 |
| 4,452,700 | 6/1984 | Schneider et al. | 210/621 |
| 4,563,277 | 1/1986 | Thorp | 210/220 |

*Primary Examiner*—Tom Wyse
*Attorney, Agent, or Firm*—Michael, Best & Friedrich

[57] ABSTRACT

In an orbal wastewater treatment process including a plurality of concentric, annular basins or channels having surface aeration means, wastewater and recycled activated sludge are mixed in a first channel by a combination of the surface aeration means and introducing an oxygen-containing gas such as air into the lower portion of the zone under conditions which produce a complete mix reaction and sufficient oxygen is supplied to meet the biological oxygen demands of the mixed liquor. The gas is introduced, preferably by a plurality of fine bubble membrane diffusers, in the form of fine bubbles having a diameter of less than about 4 mm. The mixed liquor is sequentially oxidized in second and third channels by a combination of surface aeration means and introducing an oxygen-containing gas into the lower portions of the channels, preferably by fine bubble membrane diffusers.

9 Claims, 1 Drawing Sheet

ORBAL WASTEWATER TREATMENT PROCESS

BACKGROUND OF THE INVENTION

This invention relates to treatment of BOD-containing wastewaters, such as municipal sewage, industrial wastewaters and the like, by an activated sludge process and, more particularly, to an orbal type process wherein a wastewater influent and recycled activated sludge are first mixed in an aeration zone.

Activated sludge processes have been used for some time to remove biological oxygen demand (BOD) from municipal sewage, industrial wastewaters and the like. In such a process, a wastewater influent is mixed with a microorganism-containing recycled biomass or activated sludge in an initial contact zone to form a mixed liquor. At some point in the process, the mixed liquor is aerated with sufficient oxygen to grow and maintain a satisfactory population of microorganisms which sorb, assimilate and metabolize the BOD of the wastewater.

In the activated sludge process disclosed in U.S. Pat. No. 4,056,465, the wastewater and recycled activated sludge are mixed with mechanical stirring means in an initial contact zone from which air is excluded in order to operate under anaerobic conditions. The mixed liquor is subsequently treated in one or more aeration or aerobic zones before being clarified to separate an activated sludge.

In the so-called Bardenpho activated sludge process disclosed in U.S. Pat. No. 3,964,998, wastewater and recycled activated sludge are mixed with mechanical stirring means in a first stage which is operated under anoxic conditions. The mixed liquor is subsequently aerated in a second stage, subjected to anoxic conditions in a third stage, aerated in a fourth stage and then clarified to separate an activated sludge.

In an orbal type process, wastewater and recycled activated sludge are mixed and circulated around a plurality of concentric, annular basins or channels by a plurality of surface aeration discs or other mechanical surface aeration devices which churn oxygen into the upper surface of the mixed liquor and provide sufficient agitation to prevent settling. The mixed liquor flows from one channel to the next and finally is introduced into a clarifier to separate an activated sludge. The channels can be operated as a series of complete mix reactors so that the dissolved oxygen content in the first channel in which the wastewater and recycled activated sludge is initially mixed is about 0 or less and the dissolved oxygen content is subsequently increased as the mixed liquor moves from one channel to the next.

Other activated sludge wastewater treatment processes are disclosed in U.S. Pat. Nos. 3.764,523, 3,939,068, 3,953,327 and 3,994,802.

Applicants are unaware of any prior orbal type sludge wastewater treatment process in which wastewater and recycled activated sludge are initially mixed in an aeration zone which is operated as a complete mix reactor and at a low dissolved oxygen content and an oxygen-containing gas is introduced into the bottom portion of that zone to provide supplemental mixing and a supplemental source of oxygen.

SUMMARY OF THE INVENTION

An object of the invention is to provide an orbal type activated sludge wastewater treatment process requiring less energy to operate.

Another object of the invention is to provide an orbal type wastewater treatment process in which the basins or channels can be deeper than in prior orbal type processes, thereby permitting a reduction in initial system installation costs.

A further object of the invention is to provide an orbal type wastewater treatment process in which the introduction of oxygen into the mixed liquor can be more conveniently controlled to obtain an optimum range of dissolved oxygen content.

A still further object of the invention is to provide an orbal type wastewater treatment process in which an oxygen-containing gas is introduced into the initial aeration zone in the form of fine bubbles.

Other objects, aspects and advantages of the invention will become apparent to those skilled in the art upon reviewing the following detailed description, the drawings and the appended claims.

The invention provides an orbal wastewater treatment process including a plurality of concentric, annular aeration zones or channels having surface aeration means. A BOD-containing wastewater influent and recycled activated sludge are introduced into a first channel and homogeneously mixed therein by the combined effect of the surface aeration means and introducing an oxygen-containing gas into the lower portion of the first channel under conditions which produce a complete mix reaction and sufficient oxygen is provided to meet, but not substantially exceed, the biological oxygen demand of the resulting mixed liquor. The overall dissolved oxygen content in the first channel preferably does not exceed about 0.5 mg/l. The oxygen-containing gas is injected into the contents of the first channel zone in the form of fine bubbles which have a diameter of less than about 4 mm. The mixed liquor is transferred from the first channel to a subsequent aeration zone or channel wherein the mixed liquor is contacted with an oxygen-containing gas under conditions which produce a complete mix reaction in the subsequent channel and sufficient oxygen is provided to produce an overall dissolved oxygen content of at least 0.5 mg/l. The oxidized mixed liquor from the subsequent channel is transferred to a settling zone wherein a supernatant liquid is separated from settled sludge and at least a portion of the settled sludge is recycled to the first channel as activated sludge.

In one embodiment, the subsequent aeration zone includes second and third aeration zones or channels in series and in which the mixed liquor is contacted with an oxygen-containing gas under conditions which produce a complete mix reaction in each channel and sufficient oxygen is provided to produce an overall dissolved content within the range of about 0.5 to about 1.5 mg/l in the second aeration channeland of at least 2.0 mg/l in the third aeration channel.

The oxygen-containing gas preferably is air and preferably is introduced into the first channel with a plurality of fine bubble membrane diffusers including a flexible membrane having perforations through which the oxygen-containing gas is injected into the contents of the first aeration zone. Fine bubble membrane diffusers preferably are used to introduce the oxygen-containing gas into the lower portions of the second and third channels.

In one embodiment, a portion of the mixed liquor from the second channel, the third channel or both the second and third channels is recycled to the first channel to increase the removal of nitrogen values from the wastewater.

DESCRIPTION OF THE PREFERRED EMBODIMENTS

Figure 1:
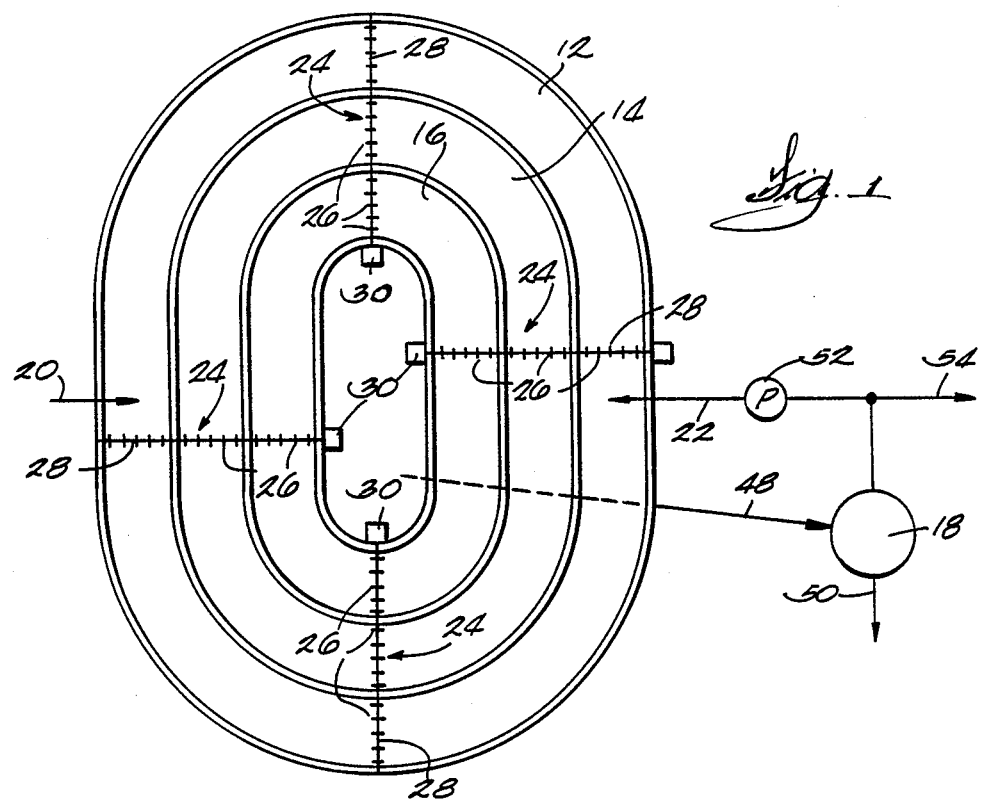
FIG. 1 is a schematic and diagrammatic top plan representation of an orbal wastewater treatment system for practicing the process of the invention.
Figure 2:
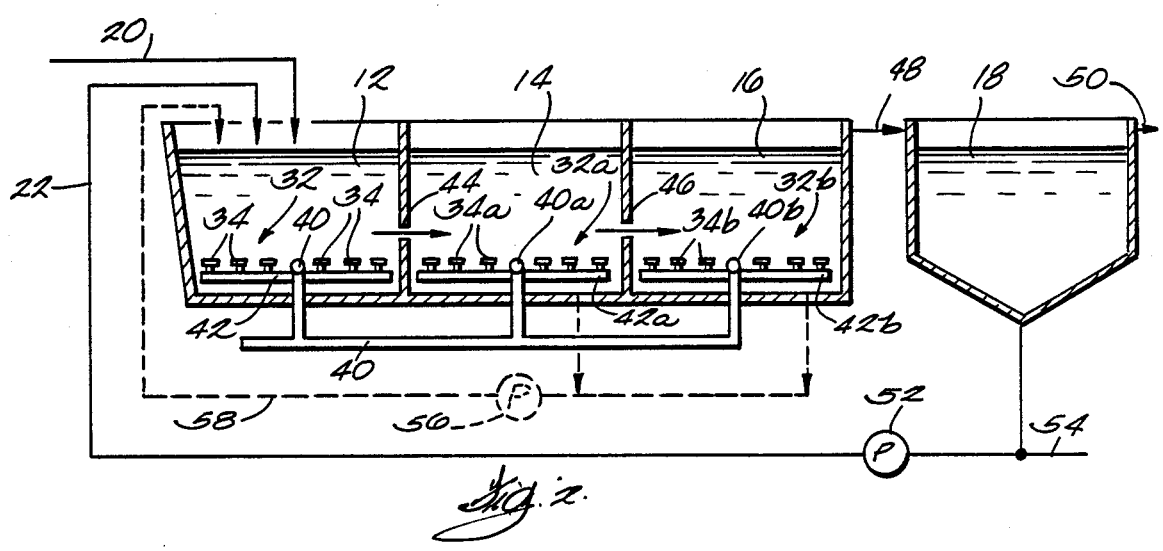
FIG. 2 is a schematic and diagrammatic side elevational representation of the system illustrated in FIG. 1.
Figure 3:
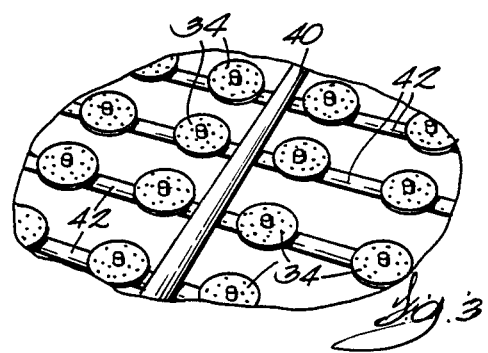
FIG. 3 is a fragmentary, top plan view of a bottom portion of the first channel including fine bubble membrane diffusers.
Figure 4:
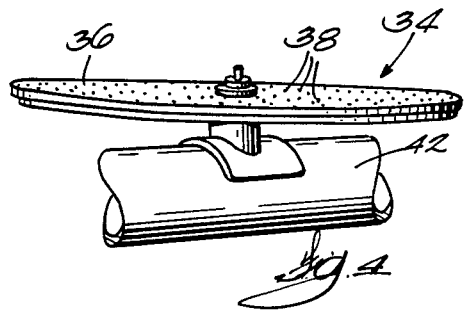
FIG. 4 is an enlarged fragmentary view of a diffuser shown in FIG. 3.

FIGS. 1 and 2 illustrate an orbal system 10 for practicing the activated sludge treatment process of the invention. The system 10 has a plurality (e.g., 3) of concentric, annular basins or channels including a first aeration zone or channel 12, a second aeration zone or channel 14 and a third aeration zone or channel 16. The system also has a settling tank or clarifier 18. A wastewater influent, which usually is subjected to screening and/or preliminary sedimentation treatment (not shown) to remove large particulate materials, is introduced into the first channel 12 via a supply conduit 20 and activated sludge is recycled from the clarifier 18 via a conduit 22.

The wastewater and recycled activated sludge is mixed in the first channel 12 in part by a plurality of surface aeration devices 24. Each surface aeration device 24 includes a plurality of aeration discs 26 mounted on a shaft 28 which is rotated by an electric motor 30 or other suitable drive means. Each aeration disc 26 has a plurality of apertures or recesses (not shown) for catching or entraining air which is dispersed into the mixed liquor as fine bubbles during disc rotation. The rotating aeration discs 26 effectively mix and aerate the upper portion of the mixed liquor and keep the mixed liquor moving around the first channel 12.

The mixed liquor in the first channel 12 is also mixed in part by a plurality of submerged aeration devices 32 which are located in the lower portion of the first channel 12 and produce fine bubbles having a diameter of less than about 4 mm, preferably about 1 to about 3 mm. The oxygen-containing gas is introduced by the surface and submerged aeration devices 24 and 32 under conditions which produce a complete mix reaction in the first channel 12 and sufficient oxygen is supplied to meet, but not substantially exceed, the biological oxygen demand of the mixed liquor. The dissolved oxygen content preferably is maintained at as close to 0 as possible. However, because of changing conditions it may periodically fluctuate above and below 0. The overall dissolved oxygen content in the first channel 12 should not exceed about 0.5 mg/l.

The oxygen-containing gas preferably is air and the submerged aeration devices preferably are conventional fine bubble (fine pore) membrane diffusers 34 having an expandable flexible member 36 including a plurality of perforations 38 through which air is injected into the contents of the first channel 12. The diffusers 34 are uniformly distributed in the lower portion of the first channel 12, either near the bottom or along one side. The diffusers 34 can be either a pipe type or a disc type like that disclosed in U.S. Pat. No. 4,631,134 which is incorporated herein by reference.

The relatively large surface area to volume ratio of fine bubbles having a diameter of 4 mm or less results in a more efficient transfer of oxygen into the mixed liquor than is possible with other aeration means. Fine bubble membrane diffusers are particularly advantageous because the membrane can be periodically flexed to dislodge material produced in the low dissolved oxygen environment of the first channel 12 which might plug the perforations 38, a shortcoming of fine bubble ceramic diffusers and plate aerators. Fine bubble membrane diffusers can be intermittently operated, if desired, to control the amount of oxygen-containing gas introduced and thereby permit the dissolved oxygen content to be maintained within an optimum range.

As the fine air bubbles rise from the diffusers 34, they produce a turbulent mixing action in the lower portion of the first channel 12 which, in combination with the mixing movement provided by the rotating aeration discs 26, prevents solids in the mixed liquor from settling. Air flow to the diffusers 34 can be controlled to produce, in combination with the air introduced by the rotating aeration discs 26, the dissolved oxygen content discussed above. Thus, the diffusers 34 serve the dual function of providing part of the oxygen required to meet the biological oxygen demand of the mixed liquor and mixing of the mixed liquor in the lower portion of the first channel 12.

The diffusers 34 can be operated to provide a substantial part of the mixing required to prevent settling and a substantial part of the oxygen required to meet the biological oxygen demands of the mixed liquor. In that case, the primary function of the rotating aeration discs 26 is to keep the mixed liquor moving around the first channel 12 and the secondary function is to introduce a relatively small amount of air into the mixed liquor. This can result in the reduction of the number of discs and the amount of energy required to operate them. If the diffusers 34 are used more as a supplemental supply of oxygen and to provide supplemental mixing in the lower portion of the first channel 12, the combined mixing and oxygen provided by the rotating aeration discs 26 and the diffusers 34 permits the first channel to be much deeper than in conventional orbal type processes employing only surface aeration devices. This can result in a reduction in initial system installation costs.

In the specific embodiment illustrated, a plurality of disc-type fine bubble membrane diffusers 34 are mounted in a grid-like array in the bottom of the first channel 12. Air is supplied under pressure through a manifold 40 connected to a plurality of air supply conduits 42 which are arranged in parallel rows. A plurality of longitudinally spaced diffusers 34 are mounted on each supply conduit 42, preferably in an array so that the diffusers on adjacent air supply conduits form rows transverse to the air supply conduits.

A portion of the mixed liquor, approximately equal to the combined flow of the wastewater influent and the recycled activated sludge, flows from the first channel 12 into the second channel 14 through a submerged transfer port 44 and from the second channel 14 into the third channel 16 through a submerged transfer port 46. The mixed liquor is moved around the second and third channels 14 and 16 by the rotating aeration discs 26 while an oxygen-containing gas is introduced into the lower portion of each channel by submerged aeration devices 32a and 32b, respectively. The combined effect of the surface and submerged aeration devices produce a complete mix reaction in both the second and third channels 14 and 16. The overall dissolved oxygen content in the second channel is at least 0.5 mg/l and preferably is maintained as close to 1.0 mg/l as possible. The overall dissolved oxygen content of the third channel is at least 2.0 mg/l.

Various suitable means can be used to introduce an oxygen-containing gas into the lower portions of the second and third channels 14 and 16. Conventional fine bubble membrane diffusers 34a and 34b like those used in the first channel 12 and arranged in a similar manner are preferred because, as mentioned above, they can serve the dual functions of supplementing the oxygen supply and agitation. Like in the first channel, the combined effect of the surface and submerged aeration devices permits these channels to be deeper than those in conventional orbal processes.

The mixed liquor is transferred from the third channel 16 into the clarifier 18 through a conduit 48. A sludge settles in the clarifier 18 and the clarified effluent or supernatant is withdrawn from the upper portion of the clarifier via a conduit 50 for further treatment prior to disposal or reuse. A portion of the settled sludge withdrawn from the bottom portion of the clarifier 18 is recycled by a pump 52 through the conduit 22 back to the first channel 12 as illustrated by solid lines in FIG. 1. Another portion of settled sludge is removed via a conduit 54. The amount of activated sludge recycled to the first channel 12 usually is about 15 to about 150, preferably about 50 to about 100%, of the wastewater influent introduced through the conduit 20.

With such a process, up to about 80% of the nitrogen values can be removed from a wide variety of wastewaters. When removal of a higher amount of nitrogen is desired, a portion of the mixed liquor from the third channel 16 and/or the second channel 14 is recycled by a pump 56 through a conduit 58 as illustrated by dashed lines in FIG. 2. The amount of mixed liquor recycled to the first channel usually is about 100 to about 400% of the wastewater influent being introduced through the conduit 20.

From the foregoing description, one skilled in the art can easily ascertain the essential characteristics of the invention and, without departing from the spirit and scope thereof, make various changes and modifications to adapt it to various usages.

We claim:

1. In a process for treating BOD-containing wastewater employing a plurality of concentric, annular aeration zones having surface aeration means and including the steps of contacting a wastewater influent with activated sludge in a first aeration zone to form a mixed liquor, oxidizing the mixed liquor in a subsequent aeration zone, separating a sludge from the mixed liquor and recycling the separated sludge to the first aeration zone as activated sludge, the improvement comprising introducing the wastewater and recycled activated sludge into said first aeration zone and homogeneously mixing same therein by a combination of said surface aeration means and introducing an oxygen-containing gas into the lower portion of said first aeration zone under conditions which produce a complete mix reaction in said first aeration zone and sufficient oxygen is provided to meet, but not substantially exceed, the biological oxygen demand of the resulting mixed liquor, said oxygen-containing gas being introduced in the form of fine bubbles which have a diameter of less than about 4 mm;

transferring the mixed liquor from said first aeration zone to a subsequent aeration zone wherein the mixed liquor is contacted with an oxygen-containing gas under conditions which produce a complete mix reaction in said subsequent aeration zone and sufficient oxygen is provided to produce an overall dissolved oxygen content of at least 0.5 mg/l;

transferring the oxidized mixed liquor from said subsequent aeration zone to a settling zone wherein a supernatant liquid is separated from settled sludge; and recycling at least a portion of the settled sludge to said first aeration zone as recycled activated sludge.

2. A process according to claim 1 wherein the overall dissolved oxygen content in said first aeration zone does not exceed about 0.5 mg/l.

3. A process according to claim 1 wherein said subsequent aeration zone comprises a second aeration zone wherein the mixed liquor from said first aeration zone is oxidized by a combination of said surface aeration means and introducing an oxygen-containing gas into the lower portion of said second aeration zone under conditions which produce a complete mix reaction in said second aeration zone and sufficient oxygen is provided to produce an overall dissolved oxygen content within the range of about 0.5 to about 1.5 mg/l in said second aeration zone; and a third aeration zone wherein the mixed liquor from said second aeration zone is oxidized by a combination of said surface aeration means and introducing an oxygen-containing gas into the lower portion of said third aeration zone under conditions which produce a complete mix reaction in said third aeration zone and sufficient oxygen is provided to produce an overall dissolved oxygen content of at least 2.0 mg/l in said third aeration zone.

4. A process according to claim 1 wherein said oxygen-containing gas is introduced into said first aeration zone with a plurality of fine bubble membrane diffusers including a flexible member having perforations through which said oxygen-containing gas is injected into the contents of said first aeration zone.

5. A process according to claim 4 wherein said oxygen-containing gas is air.

6. A process according to claim 3 wherein said oxygen-containing gas is introduced with a plurality of fine bubble membrane diffusers including a flexible membrane having perforations through which the oxygen-containing gas is injected.

7. A process according to claim 6 wherein said oxygen-containing gas is air.

8. A process according to claim 1 including the step of recycling a portion of the mixed liquor from said subsequent aeration zone to said first aeration zone for mixing therein with the wastewater and the recycled activated sludge.

9. A process according to claim 3 including the step of recycling a portion of the mixed liquor from said second aeration zone, said third aeration zone or both said second and third aeration zones to said first aeration zone for mixing therein with the wastewater and the recycled activated sludge.

* * * * *

UNITED STATES PATENT AND TRADEMARK OFFICE
CERTIFICATE OF CORRECTION

PATENT NO : 4,975,197
DATED : December 4, 1990
INVENTOR(S): Wittmann et al.

It is certified that error appears in the above-identified patent and that said Letters Patent is hereby corrected as shown below:

In the Title, "ORBAL" should be --ORBAL$^{TM}$--

In the Abstract, line 1, "orbal" should be --Orbal--

Column 1, line 2, "ORBAL" should be --ORBAL$^{TM}$--
line 9, "orbal type" should be --Orbal--
line 38, "orbal type" should be --Orbal--
line 56, "orbal type" should be --Orbal--
line 66, "orbal type" should be --Orbal--

Column 2, lines 1-2, "orbal type" should be --Orbal--
line 3, "orbal type" should be --Orbal--
line 7, "orbal type" should be --Orbal--
line 12, "orbal type" should be --Orbal--
line 19, "orbal" should be --Orbal--

Column 3, line 6, "orbal" should be --Orbal--
line 18, "orbal" should be --Orbal--

Column 4, line 45, "orbal type" should be --Orbal--

Signed and Sealed this

Twenty-fourth Day of October, 2000

Attest:

Q. TODD DICKINSON

*Attesting Officer*     *Director of Patents and Trademarks*